(12) United States Patent
Gonzales

(10) Patent No.: US 7,692,718 B1
(45) Date of Patent: Apr. 6, 2010

(54) VIDEO CAMERA LIGHT SHIELD

(76) Inventor: Rolando Gonzales, 8981 Helenjames Ave., San Diego, CA (US) 92126

( * ) Notice: Subject to any disclaimer, the term of this patent is extended or adjusted under 35 U.S.C. 154(b) by 409 days.

(21) Appl. No.: 11/697,775

(22) Filed: Apr. 9, 2007

Related U.S. Application Data

(63) Continuation-in-part of application No. 11/459,148, filed on Jul. 21, 2006.

(51) Int. Cl.
 *H04N 5/225* (2006.01)
(52) U.S. Cl. .................. 348/373; 396/534; 359/601
(58) Field of Classification Search .................. 396/534
 See application file for complete search history.

(56) References Cited

U.S. PATENT DOCUMENTS

| | | | | |
|---|---|---|---|---|
| 5,710,860 A | * | 1/1998 | Kim | ........................... 386/118 |
| 6,687,460 B2 | * | 2/2004 | Muller | ........................ 396/534 |
| 7,083,291 B1 | * | 8/2006 | Yong et al. | .................. 359/612 |
| 7,196,742 B2 | * | 3/2007 | Skjellerup et al. | ........... 348/834 |
| 7,486,887 B2 | * | 2/2009 | Tian | ........................... 396/544 |
| 7,529,479 B2 | * | 5/2009 | Watanabe | ................... 396/287 |

* cited by examiner

*Primary Examiner*—Jason Whipkey
*Assistant Examiner*—Dennis Hogue
(74) *Attorney, Agent, or Firm*—Frank G. Morkunas

(57) ABSTRACT

A video camera light shield for use with a video camera which has an adjustable hood component covering the LCD monitor and lens of a video camera, wherein the hood component is a two-section hood component adjustably slidable front to rear, with a two-piece front plate attached to the two-piece hood component which is adjustably side to side to adjust the light shield to more effectively fit to a variety of different video camera styles and sizes for best performance results.

28 Claims, 6 Drawing Sheets

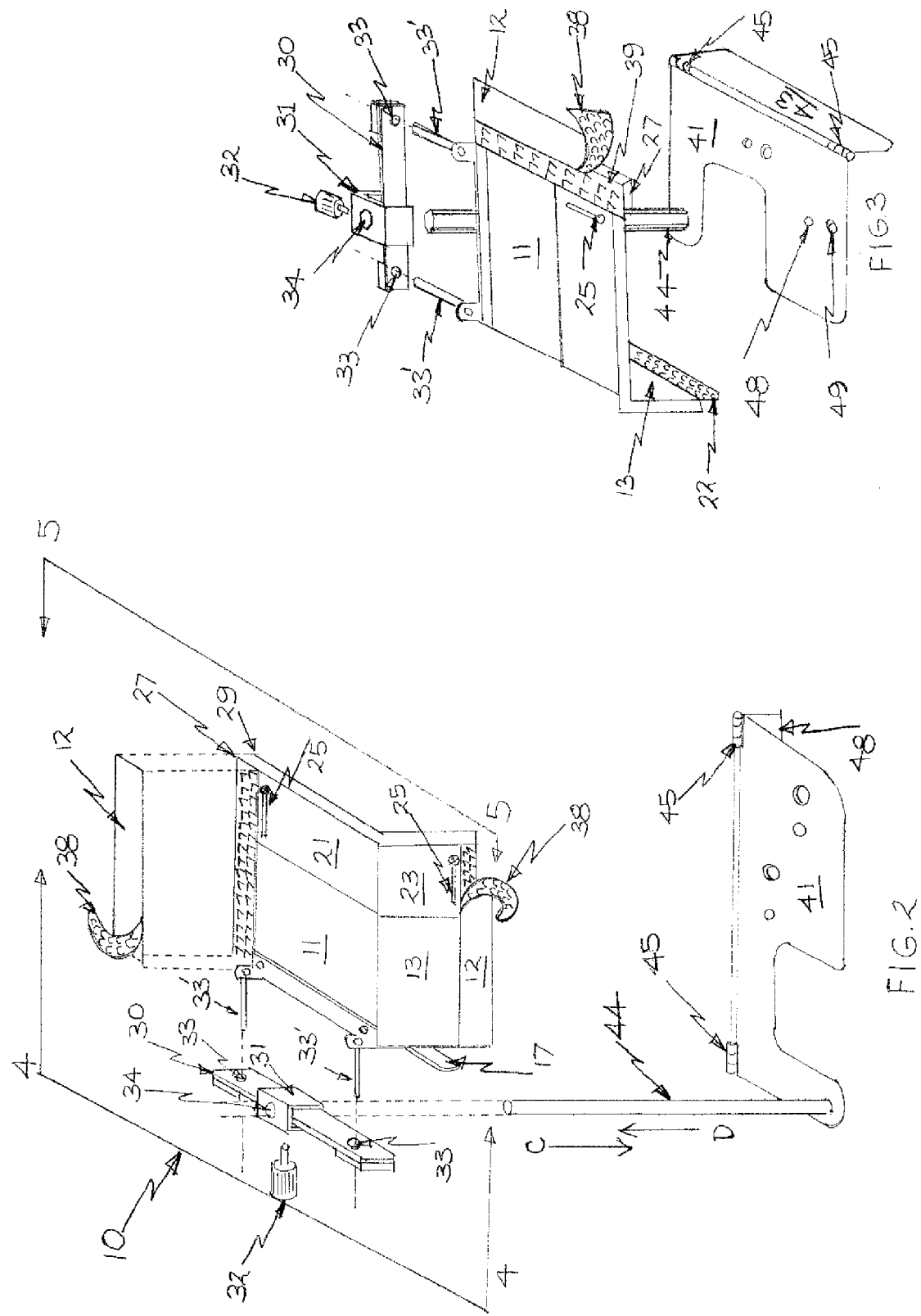

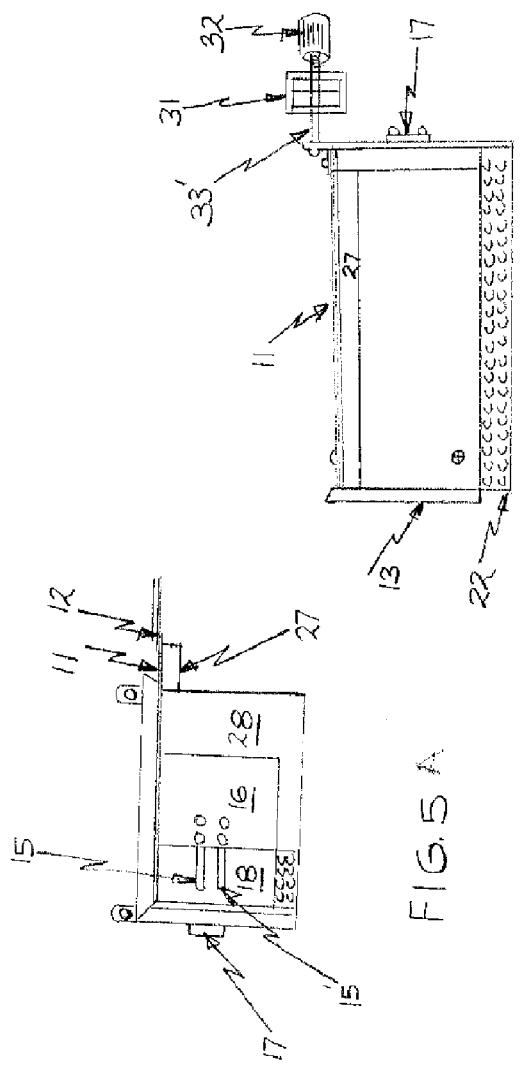
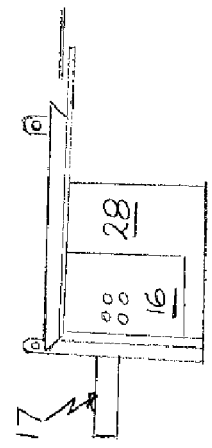
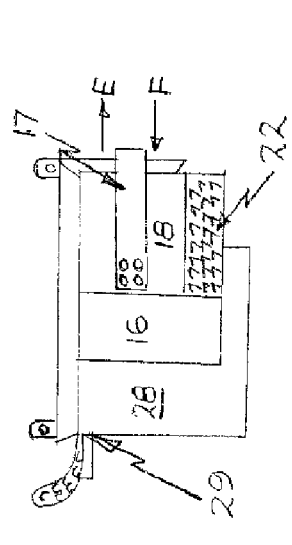
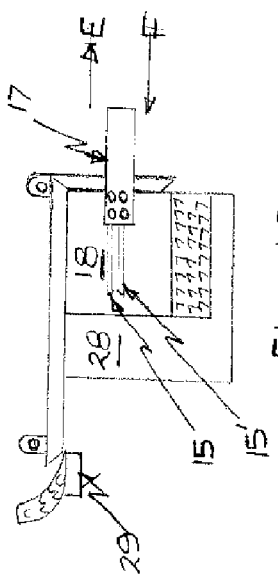

VIDEO CAMERA LIGHT SHIELD

CROSS REFERENCES TO RELATED APPLICATIONS

This application is a continuation-in-part of my co-pending application, application Ser. No. 11/459,148, filed on Jul. 21, 2006. This pending application is hereby incorporated by reference into this application.

STATEMENT REGARDING FEDERALLY-SPONSORED RESEARCH OR DEVELOPMENT

Not applicable.

BACKGROUND

This device of the present disclosure relates to an improvement in video cameras and video camera recording, and more particularly to preventing or greatly reducing excess sunlight or other external or internal light sources, natural or artificial, from detracting from the recording process.

Over the course of years, video cameras have undergone numerous modifications and improvements as to ease of use, quality of recording, and duration of recording capabilities. As to quality, many video cameras have the ability to self-adjust for light exposure thereby making great strides to ensure top quality results for recordings. The addition of LCD viewing or monitors has further simplified the recording process and allows the user to see, in real time and actual quality, to the extent possible, what is being recorded.

The LCD monitors on video cameras have undergone many modifications and enhancements, one of which is having the LCD monitor attached nearly flush to the side of the video camera in such a fashion as to permit the LCD monitor to open from the side of the video camera and swing outward like a door. This provides for a greater ability for the user to view the subject matter of what the user is recording. Once swung open, the LCD monitors may also be rotated and angled as desired for further ease of viewing while recording.

The only drawback to the extended swinging and rotating of the LCD monitor is, that if too much external lighting is exposed to the LCD monitor, the picture on the LCD monitor is difficult to see by the user. The more excess lighting, such as sunlight for example, the greater the difficulty and, consequently, the less of the real-time picture being seen by the user.

No prior art device for use with video cameras, as referenced above, allows the user to control, or virtually eliminate, all the sunlight and other external artificial lighting from affecting, however minimally, the ability to see the LCD monitor as clearly as the subject matter is being recorded. The device of the present disclosure, the improved video camera light shield, permits the user to adjust the video camera light shield from front to rear and, for the lens, a front adjustable plate which adjusts side to side. This adjustability accommodates all video camera sizes and, by such dual adjustments, virtually fully shield the LCD monitor and the lens of the video camera from sunlight and all other unwanted excess external lighting.

By careful adjustments to the video camera light shield of the present disclosure, a user can allow only as much, if any, sunlight, or other external artificial light for that matter, to engage the LCD monitor and otherwise distort the user's real time viewing capability.

With the light shield of the present disclosure a user can control sun external lighting and thereby create a unique, professional, and artful recording which the user controls.

Accordingly, several objects and advantages of the light shield of the present disclosure are:

a. To virtually completely shield the LCD monitor of a video camera in use from unwanted external and internal lighting, be it sunlight or artificial lighting.

b. To limit the amount of unwanted light from reaching the lens, to control such light, and the thereby produce a better recorded video clip.

c. To permit a user to adjust the amount of external lighting the LCD monitor and the lens of a video camera receives from virtually no amount to full exposure or any amount in between as desired by the user.

d. To provide for a light shielding device capable of mounting on virtually any type and model of video camera, single lens reflex camera, or other compact cameras having LCD monitors.

e. To create a light shielding device which is relatively inexpensive to purchase and is extremely easy to use.

f. To provide maximum comfort and support for a user's palm by means of the side plate when the user is taking pictures/video without a tripod support or is taking pictures/video while holding the camera with one hand.

g. To providing an adjustable and removable shoulder support to better accommodate different user's preferences.

The foregoing has outlined some of the more pertinent objects of the light shield of the present disclosure. These objects should be construed to be merely illustrative of some of the more prominent features and applications of the light shield of the present disclosure. Many other beneficial results can be attained by applying the disclosed light shield of the present disclosure in a different manner or by modifying the light shield of the present disclosure within the scope of the disclosure. Accordingly, other objects and a fuller understanding of the monitor shield of the present disclosure may be had by referring to the summary of the light shield of the present disclosure and the detailed description of the preferred embodiment in addition to the scope of the light shield of the present disclosure defined by the claims taken in conjunction with the accompanying drawings.

SUMMARY

The above-noted problems, among others, are overcome by the light shield of the present disclosure. Briefly stated, the light shield of the present disclosure contemplates a video camera light shield having a first hood component with a first upper member and a first side member attached to the first upper member; and a second hood component with a second upper member and a second side member attached to the second upper member wherein the second hood component is slidingly attached to the first hood component for adjustable fit of the light shield onto a variety of different video camera styles and sizes. A first front plate is attached to the first side member and a second front plate is slidingly and adjustably attached to the first front plate to adjust the light shield to more effectively fit to a variety of different video camera styles and sizes for best performance results.

The foregoing has outlined the more pertinent and important features of the light shield of the present disclosure in order that the detailed description that follows may be better understood so the present contributions to the art may be more fully appreciated. Additional features of the light shield of the present disclosure will be described hereinafter which form the subject of the claims. It should be appreciated by those skilled in the art that the conception and the disclosed specific embodiment may be readily utilized as a basis for modifying or designing other structures and methods for carrying out the same purposes of the light shield of the present disclosure. It also should be realized by those skilled in the art that such equivalent constructions and methods do not depart from the spirit and scope of the light shield of the present disclosure as set forth in the appended claims.

BRIEF DESCRIPTION OF THE DRAWINGS

For a fuller understanding of the nature and objects of the light shield of the present disclosure, reference should be had to the following detailed description taken in conjunction with the accompanying drawings in which:

FIG. 2 is a detailed exploded perspective view of the hood components of the video camera light shield.

FIG. 3 is a perspective view from the back side of the upper components of the video camera light shield as taken on line 3-3 of FIG. 1.

FIG. 4A is a front elevation view of the hood components of the video camera light shield in a closed mode as taken on line 4-4 of FIG. 1.

FIG. 4B is a front elevation view of the hood components of the video camera light shield in an open mode as taken on line 4-4 of FIG. 1.

FIG. 5A is a rear elevation view of the hood components of the video camera light shield, as taken on line 5-5 of FIG. 1, in a closed mode.

FIG. 5B is a rear elevation view of the hood components of the video camera light shield, as taken on line 5-5 of FIG. 1, in an open mode.

FIG. 6 is a side elevation view of the hood components of the video camera light shield as taken on line 6-6 of FIG. 1.

DETAILED DESCRIPTION

Figure 1:
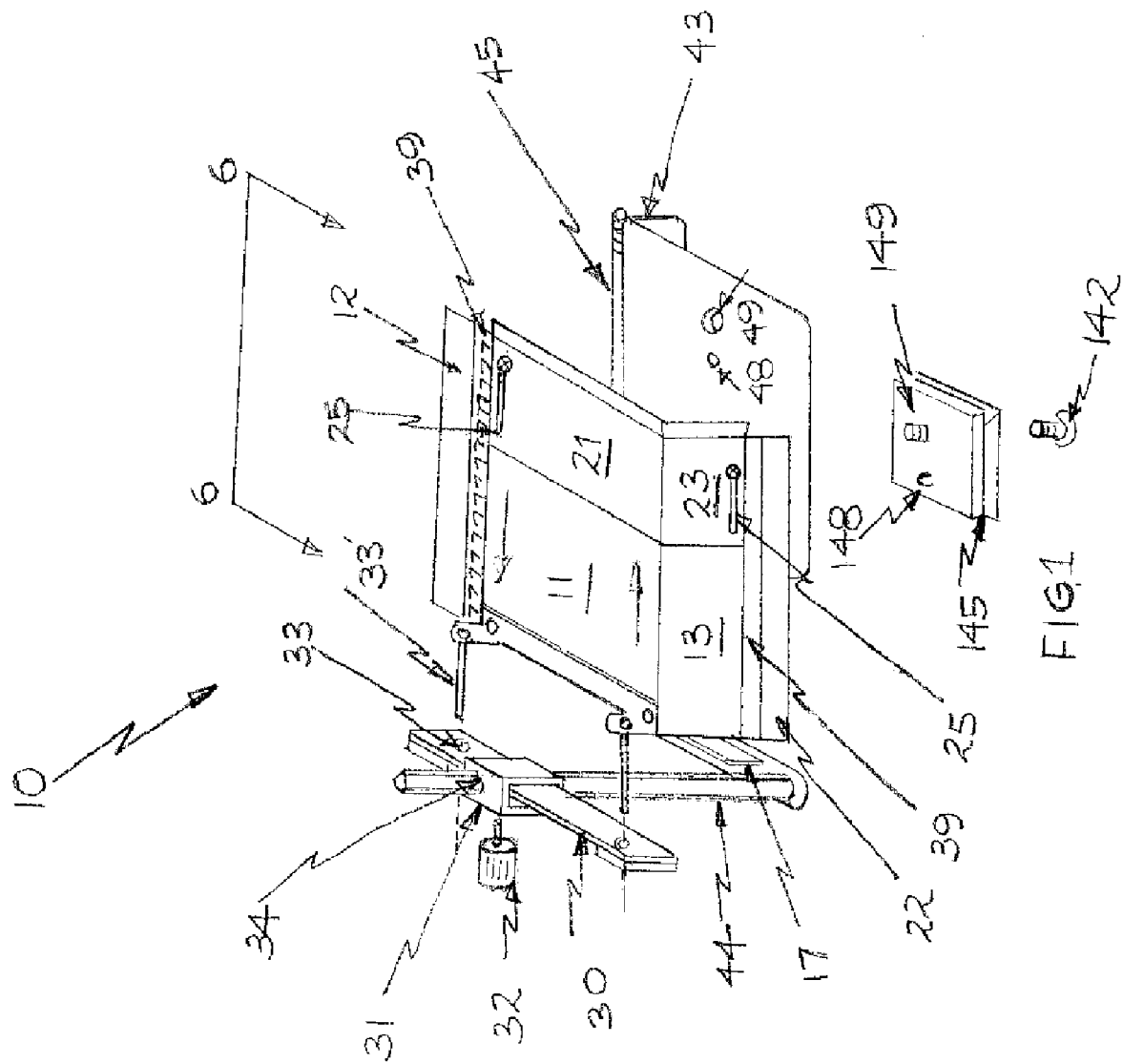
FIG. 1 is a perspective view of the upper member of the hood components of the video camera light shield.

Referring now to the drawings in detail and in particular to FIG. 1, reference character 10 generally designates a video camera light shield constructed in accordance with a preferred embodiment of the present disclosure. FIG. 1 shows a first hood component comprised of a first upper member 11 and a first side member 13 attached along one side of the top edge of the first upper member 11.

It also has a second hood component comprised of a second upper member 21 and a second side member 23 attached along one side of the top edge of the second upper member 21. The two hood components 11, 13 and 21, 23 are slidingly adjustable in relation to one another in a forward to back translating movement as reflected by arrows A-B. This is useful for larger video cameras to increase the length of the light shield 10 as necessary to shield the LCD monitor at the rear of the video camera.

To accommodate such forward-to-rearward adjustability, at least two guide slots 25 are either on the second upper member 21 and the second side member 23 or may be on the first upper member 11 and the first side member 21 and in either case, held thereat by a suitable conventional means, including, but not limited to, rods, pins, rivets, threaded nut-and-bolt combinations, and the like. Being slidingly held together as such permits front to back adjustment as needed and secured in place if necessary.

Along the bottom edge of the first and second side member 13, 23 is a removable adjustable flexible extension 22. Along the top of the first and second upper member 11, 21 attached along the side opposite of the first and second side member 13, 23 and running approximately from front to rear thereat, is a removable adjustable flexible extension 12.

Each of the removable adjustable extensions 12, 22 are attached to their respective members [first and second upper members 11, 21 and first and second side members 13, 23] by a suitable fastening component such as, but not limited to, cooperating hook-and-loop fasteners 38, 39 [as illustrated in FIG. 3] commonly referred to by the trademark Velcro®.

These extensions 12, 22 and cooperating fasteners 38, 39 not only provide for minute light-shielding adjustments but also function to hold the adjusted position of the first hood component 11, 21 to the second hood component 13, 23.

It must be understood that the hook side of the hook-and-loop may be either on the respective extension 12, 22 with the loop side on the respective first and second upper members 11, 21 or first and second side members 13, 23 or such may be reversed with the loop on the respective extension 12, 22 and the hook on the respective member 11, 21, 13, 23. What is important is that the fasteners 38, 39 cooperate with the extensions 12, 22 and the respective member 11, 21, 13, 23.

The purpose of the extensions 12, 22, in addition to providing securing support to the adjustments made with respect to the first and second hood components, 11, 21, 13, 23, is to permit the user, once the video camera is attached to the light shield 10, to adjust the extensions accordingly, in-out, back-forth, side-to-side, angled, and the like such that the respective extensions 12, 22 maintain contact with the light shield and also are brought into direct contact with the video camera. This makes the light shield extremely flexible and able to accommodate virtually all makes, models, and sizes of video camera while still maximizing its light-shielding capabilities.

With a video camera which is tall, the side extension 22 is adjusted downward so that virtually no light gaps, if any, exist between the side extension 22 and the base member 41. With a video which is wide, the top extension 12 is adjusted outward from the first and second upper members 11, 13 and toward the video camera so that virtually no light gaps, if any, exist between the top extension 12 and the video camera.

As best illustrated in FIGS. 1-3, and described in my co-pending application, the embodiment of the base member 41 of the light shield 10 has a bottom extension 43 along the side below the top extension 12 of the first and second upper members 11, 13. This bottom extension is attached to the base member 41 by hinge components 45. Once a video camera is attached to the light shield 10, the hinged bottom extension 43 may be swung upward toward the video camera to come into contact with the video camera, be held thereat by the user's hand, and to thereby prevent unwanted external lighting from passing therethrough which would adversely affect the LCD monitor viewing capabilities.

An upstanding rod 44 on the base member 41 serves to adjustably connect the two hood components 11, 13, 21, 23 to the base member 41. As illustrated in my co-pending application, the figures, the upstanding rod 44 may be round, oval, squared, or multi-sided. A guide assembly 30 adjustably fits into slide assembly 31 which is adapted to permit the guide assembly to translate side to side. An aperture 34 on the slide assembly 31 is similarly shaped as the rod circumference or outer perimeter fits slidingly onto the upstanding rod 44. As so fitted, the slide assembly 31 may be moved up and down, in the directions of arrows C, D, on upstanding rod 44 as necessary.

A locking member 32 on the slide assembly 31 is threadably connectable to the slide assembly 31 thereat by a threaded aperture in the side of the slide assembly 31. If the locking member 32 is threaded completely into the threaded aperture of the slide assembly 31, it would encroach therethrough and tighten onto the upstanding rod 44. Tightening of the locking member 32 with the slide assembly 31 on the upstanding rod 44 maintains its position. This structure permits a user to move the slide assembly 31 up and down on the upstanding rod 44 to a desired height location and to lock it in place thereat. This is extremely useful to accommodate different size video camera while still maintaining the full functionality and capability of the light shield 10. When the locking member 32 is tightened into the slide assembly 31, it will also hold guide assembly 30 at its place of adjustment.

The guide assembly 30 also has an aperture 33 on each opposite end. These apertures 33 cooperate with hood rods 33' which are on the front of the first upper member 11 and extend forward thereof. This combination of apertures 33 to hood rods 33' function as a stabilizer between the hood components of the light shield and the upstanding rod 44 to base member 41 and guide assembly 30 and slide assembly 31.

FIGS. 4A, 4B, 5A, and 5B illustrate yet another unique feature of the light shield 10. A first front plate 18 is attached to the first side member 13 and extends toward, but not completely to, the opposite side; i.e., the open end 29 of the hood components 11, 21. A second front plate 16 is slidably connected to the first front plate 18 through guide slots 15 in such as fashion as to translate side to side in the directions of arrows E, F. Pull tab 17 more readily facilitates such translation.

FIG. 4A represents a closed mode; i.e., where the second front plate 16 had been slid in the direction of arrow F toward the video camera lens. Sliding in the direction of arrow E will place the hood components into the open mode. FIG. 4B represents the open mode; i.e., where the second front plate 16 had been slid in the direction of arrow E. Sliding the second front plate 16 in the direction of arrow F will place the hood components in the closed mode. FIGS. 5A and 5B show the hood components from the rear in the closed mode and open mode, respectively.

Attachment of the second front plate 16 to the first front plate 18 through these guide slots 15 is by any conventional means, including, but not limited to, rods, pins, rivets, threaded nut-and-bolt combinations, and the like, and secured in place if necessary. A cushion member 28 is on the second front plate 16 extending toward the open end 29 of the hood components 11, 21.

This combination of adjustable front plates 16, 18 and cushion member 28, permits a user to adjust the front plate components 16, 18 as close to the camera lens as possible and rest the cushion member 28 on the lens or side of the lens to maximize desired light-inhibiting effects.

FIGS. 7 through 10 illustrate a second embodiment of the base component 141. A front member 120 is slidably attached to the front of the base component 141 by telescoping rods 116 which accommodate movement in the direction of arrows G, H. The upstanding rod 44 is at one side of the front member 120 and projects upward therefrom.

A slot 53 on the front member 120 is adapted to receive a removable locking component 14, 19, 24. This locking component comprises a slide plate 24 which has on it a conventional locking member 14 with receiving aperture 19. The slide plate 24, with locking member 14 fits into slot 53. The receiving aperture 19, when the locking member 14 is opened, is adapted to receive an external rod from above or from below. When the external rod is received in the aperture 19, the locking member 14 is clamped closed in a locking mode to hold the external rod securely in place.

Also on the front member 120 is a non-removable locking component 114, 119 similarly constructed as is the above described removable locking component 14, 19, 24 but without the slide plate 24. The non-removable locking component 114, 119 functions in the same manner as the above described removable lockable component 14, 19, 24.

Figure 7:
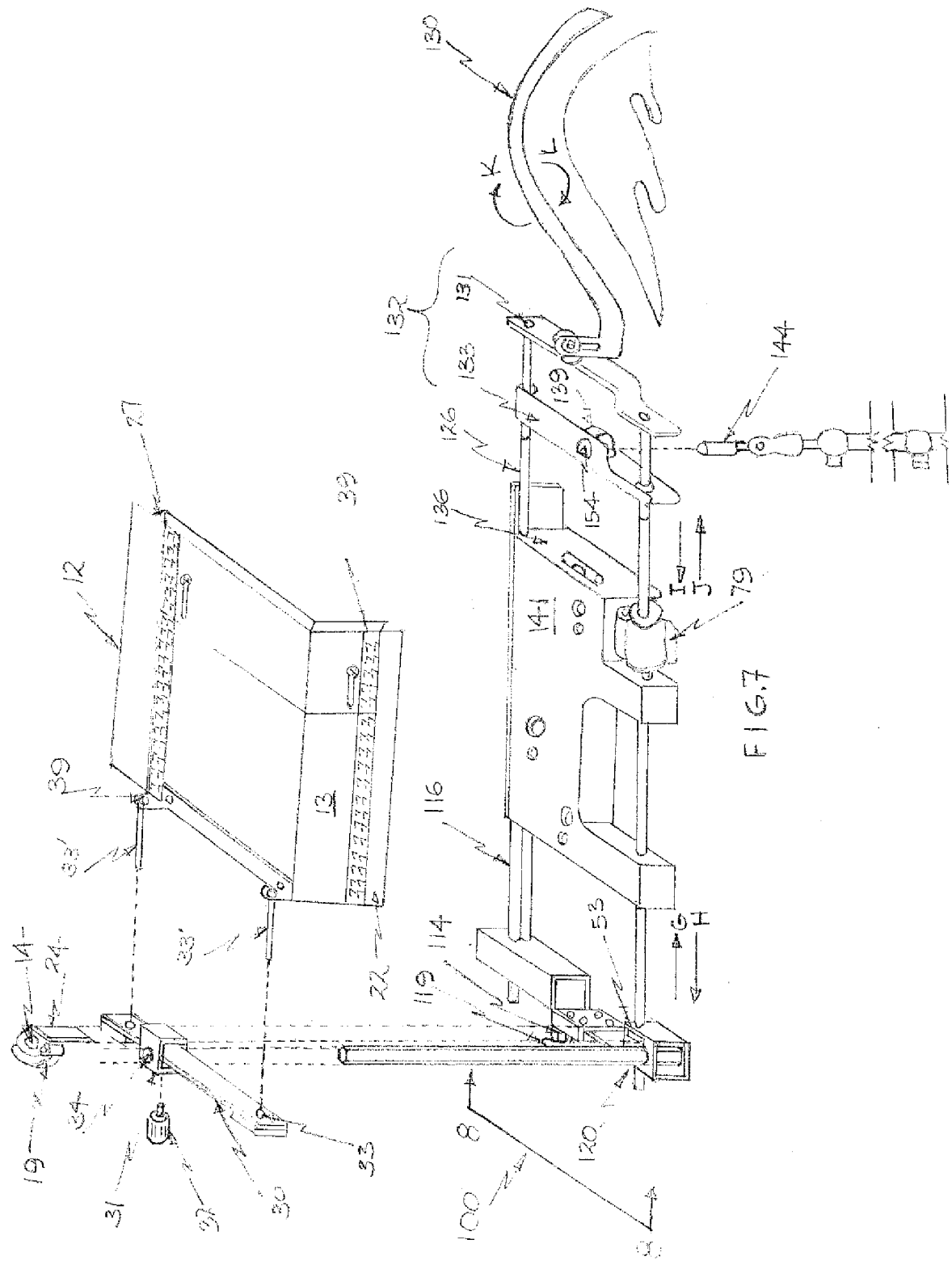
FIG. 7 is a detailed exploded perspective view of the video camera light shield with a second embodiment of the base component.
Figure 9:
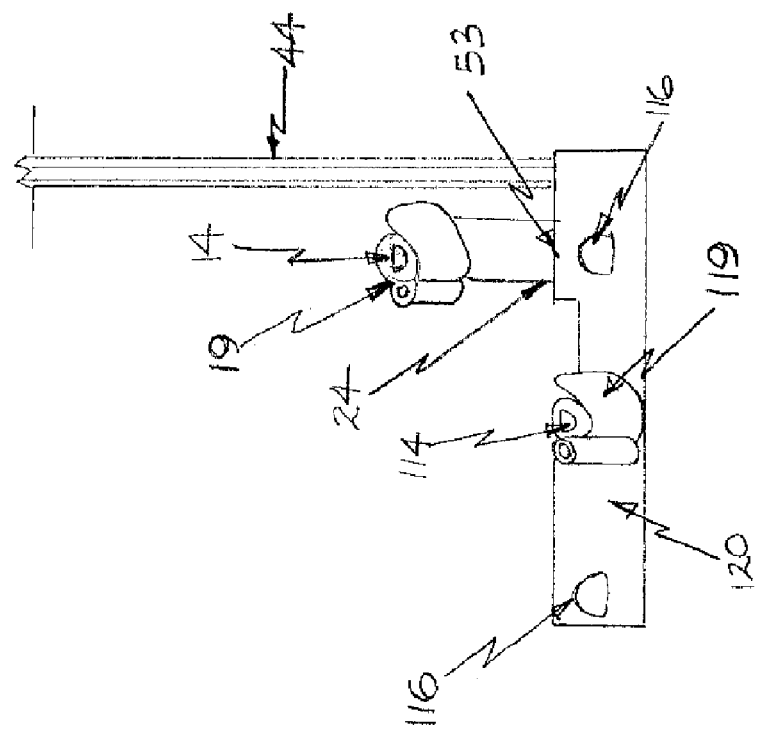
FIG. 9 is a detailed view of the front end of the base component of the video camera light shield as taken on line 9-9 of FIG. 8.
Figure 8:
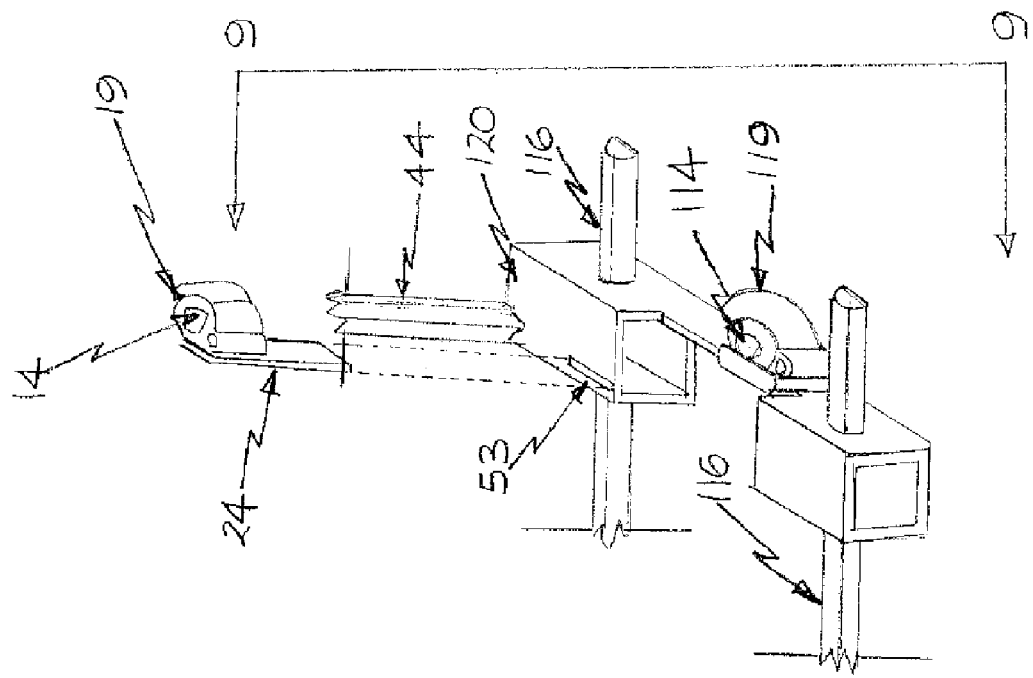
FIG. 8 is a detailed view of the front end of the base component of the video camera light shield as taken on line 8-8 of FIG. 7.

FIG. 7 illustrates a two-piece rear member 132 comprising a proximal rear member 133, which closer to the non-movable rear 136 of the base component 141 and in between the non-movable rear 136 of the base component 141 and the distal rear member 131, and a proximal rear member 131.

The distal rear member 131 is slidably adjustable away from, and back to, the proximal rear member 133, and the proximal rear member 133 is slidably adjustable to or from the distal rear member 131 and to or from the non-movable rear 136 of the base component 141 in the direction of arrows I, J.

The proximal rear member 133 and the distal rear member 131 are telescopically attached to the base component 141 by telescoping rods 126. A conventional clamping lock 79 on either one or both of the telescoping rods 126 secures the position into which the two-piece rear member 132 has been adjusted.

A shoulder support 130 is removably and rotatably attached to the distal rear member 131. In embodiments where there are no slidably rear members, the should support 130 may be removably and rotatably attached to the rear 136 of the base component 141. The shoulder support 130 is attached by any conventional means suited for the intended purpose and such should accommodate rotation as desired in a clockwise or counter-clockwise rotation as illustrated by arrows K, L.

A rear locking component 134, 139, similar to the locking components described above with clamp lock 139 and receiving aperture 134, is affixed to any rearward portion of the base component 141. As shown, the rear locking component 134, 139 is on the proximal rear member 133 but it may also be on the distal rear member 131 in addition to the or alone; or may be on the rear 136 of the base component 141 in addition or alone. The function of the rear locking component 134, 139, as described above, is to receive an external rod and lock the external rod into place onto the base component 141.

Figure 10:
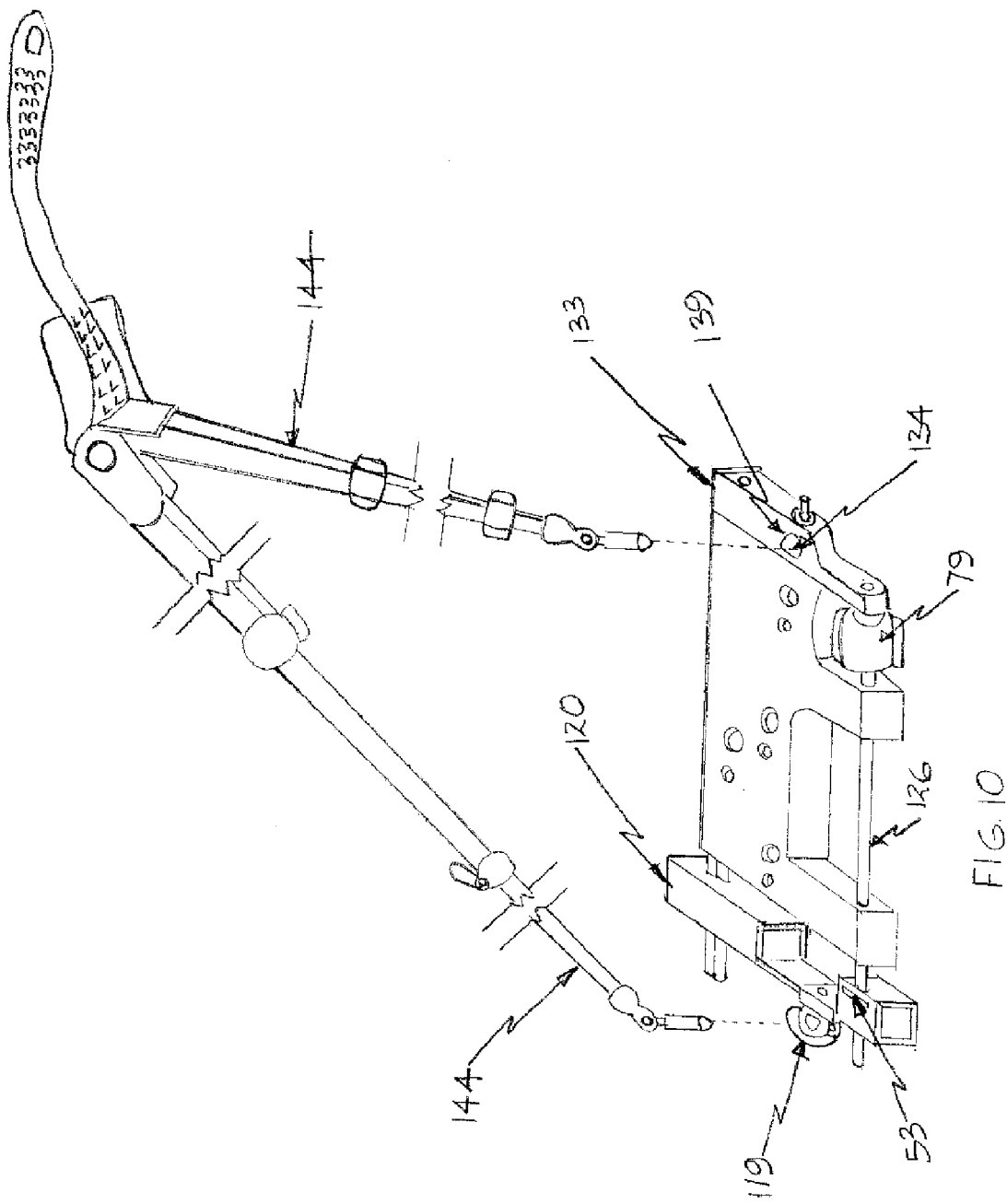
FIG. 10 is a detailed view of the second embodiment of the base component with external rods attached from above.

Typical external rods include, but are not limited to, rods from camera tripods, camera bi-pods, camera stabilizers, and the like. FIG. 10 illustrates this functionality with regard to one or more external rod 144 attached and secured to the base component 141. As so secured, with shoulder support 130 removed, and with a video camera [not shown] attached to the base component 141, a user may capture video images from a lower angle and be accorded a great deal of stability.

For either base component 41, 141 a user would attach a conventional shoe 145 with shoe guide 148 and threaded guide 149 through guide holes 48, 49, respectively, on the base component 41, 141, and then insert the shoe lock screw 142 to lock the shoe 145 to the base component 41, 141. The video camera then attaches to the shoe 145 by threading onto the threaded guide 149 protruding from the base component 41, 141.

The present disclosure includes that contained in the present claims as well as that of the foregoing description. Although this light shield of the present disclosure has been described in its preferred forms with a certain degree of particularity, it is understood that the present disclosure of the preferred forms has been made only by way of example and numerous changes in the details of construction and combination and arrangement of parts may be resorted to without departing from the spirit and scope of the light shield of the present disclosure. Accordingly, the scope of the light shield of the present disclosure should be determined not by the embodiment[s] illustrated, but by the appended claims and their legal equivalents.

Applicant[s] have attempted to disclose all the embodiment[s] of the light shield of the present disclosure that could be reasonably foreseen. It must be understood, however, that there may be unforeseeable insubstantial modifications to light shield of the present disclosure that remain as equivalents and thereby falling within the scope of the light shield of the present disclosure.

What is claimed is:

1. A video camera light shield for use with a video camera, comprising:
    (a) a first hood component having a first upper member and a first side member attached to said first upper member;
    (b) a second hood component having a second upper member and a second side member attached to said second upper member wherein said second hood component is slidingly attached to said first hood component; and
    (c) a base component having a front, a rear, a top, and a bottom, said base component receiving said video camera on its top and having attaching means for attaching said first hood component to said base component and wherein the front of said base component further comprises a front member slidingly attached to said base component by at least two front telescoping rods.

2. The video camera light shield of claim 1 further comprising a first front plate attached to said first side member and a second front plate slidingly attached to said first front plate.

3. The video camera light shield of claim 2 further comprising front plate registration means for sliding and adjusting said second front plate in a side to side relation to said first front plate to maximize shielding light from a lens on said video camera.

4. The video camera light shield of claim 3 wherein said front plate registration means comprises guide slots and a pull tab on said first front plate.

5. The video camera light shield of claim 1 further comprising hood registration means for sliding and adjusting said second hood component forward and rearward in relation to said first hood component to maximize shielding light from a monitor on said video camera or for sliding and adjusting said first hood component forward and rearward in relation to said second hood component to maximize shielding light from a monitor on said video camera.

6. The video camera light shield of claim 5 wherein said hood registration means comprises guide slots on said second upper member and guide slots on said second side member.

7. The video camera light shield of claim 1 wherein said attaching means comprises an upstanding rod at the front of said base component, at least two forward protruding hood rods emanating from said first upper hood member, and guide means for adjustably receiving said upstanding rod and for adjustably receiving said hood rods.

8. The video camera light shield of claim 7 wherein said guide means comprises:
    (a) a slide assembly slidingly attachable in an up and down motion onto said upstanding rod;
    (b) an assembly locking component on said slide assembly for locking said sliding assembly in a desired vertical position on said upstanding rod; and
    (c) at least two apertures on said slide assembly adapted to receive therethrough said hood rods.

9. The video camera light shield of claim 1 wherein said front member further comprises a first receiving means for receiving an external rod and securing said external rod to said front member.

10. The video camera light shield of claim 1 wherein said front member further comprises a second receiving means for receiving an external rod and securing said external rod to said front member wherein said second receiving means is removably attachable to said front member.

11. The video camera light shield of claim 1 wherein the rear of said base component further comprises a rear member slidingly attached to said base component by at least two rear telescoping rods.

12. The video camera light shield of claim 11 wherein said rear member comprises a slidable proximal rear member and a slidable distal rear member in relation to the rear of said base component and wherein said slidable proximal rear member is slidingly movable to and from the rear of said base component and is slidingly movable to and from said slidable distal rear member, and wherein said slidable distal rear member is slidingly movable to and from said slidable proximal rear member.

13. The video camera light shield of claim 12 wherein said slidable proximal rear member further comprises a rear member receiving means for receiving an external rod and securing said external rod to said base component.

14. The video camera light shield of claim 12 wherein said slidable distal rear member further comprises a rotatable shoulder support member removably attachable to said slidable distal rear member.

15. A video camera light shield for use with a video camera, comprising:
    (a) a first hood component having a first upper member and a first side member attached to said first upper member;
    (b) a second hood component having a second upper member and a second side member attached to said second upper member wherein said second hood component is slidingly attached to said first hood component; and
    (c) a base component having a front, a rear, a top, and a bottom, said base component receiving said video camera on its top and having attaching means for attaching said first hood component to said base component and wherein the rear of said base component further comprises a rear member slidingly attached to said base component by at least two rear telescoping rods.

16. The video camera light shield of claim 15 further comprising a first front plate attached to said first side member and a second front plate slidingly attached to said first front plate.

17. The video camera light shield of claim 16 further comprising front plate registration means for sliding and adjusting said second front plate in a side to side relation to said first front plate to maximize shielding light from a lens on said video camera.

18. The video camera light shield of claim 17 wherein said front plate registration means comprises guide slots and a pull tab on said first front plate.

19. The video camera light shield of claim 15 further comprising hood registration means for sliding and adjusting said second hood component forward and rearward in relation to said first hood component to maximize shielding light from a monitor on said video camera or for sliding and adjusting said first hood component forward and rearward in relation to said second hood component to maximize shielding light from a monitor on said video camera.

20. The video camera light shield of claim 19 wherein said hood registration means comprises guide slots on said second upper member and guide slots on said second side member.

21. The video camera light shield of claim 15 wherein said attaching means comprises an upstanding rod at the front of said base component, at least two forward protruding hood rods emanating from said first upper hood member, and guide means for adjustably receiving said upstanding rod and for adjustably receiving said hood rods.

22. The video camera light shield of claim 21 wherein said guide means comprises:
   (a) a slide assembly slidingly attachable in an up and down motion onto said upstanding rod;
   (b) an assembly locking component on said slide assembly for locking said sliding assembly in a desired vertical position on said upstanding rod; and
   (c) at least two apertures on said slide assembly adapted to receive therethrough said hood rods.

23. The video camera light shield of claim 15 wherein the front of said base component further comprises a front member slidingly attached to said base component by at least two front telescoping rods.

24. The video camera light shield of claim 23 wherein said front member further comprises a first receiving means for receiving an external rod and securing said external rod to said front member.

25. The video camera light shield of claim 23 wherein said front member further comprises a second receiving means for receiving an external rod and securing said external rod to said front member wherein said second receiving means is removably attachable to said front member.

26. The video camera light shield of claim 15 wherein said rear member comprises a slidable proximal rear member and a slidable distal rear member in relation to the rear of said base component and wherein said slidable proximal rear member is slidingly movable to and from the rear of said base component and is slidingly movable to and from said slidable distal rear member, and wherein said slidable distal rear member is slidingly movable to and from said slidable proximal rear member.

27. The video camera light shield of claim 26 wherein said slidable proximal rear member further comprises a rear member receiving means for receiving an external rod and securing said external rod to said base component.

28. The video camera light shield of claim 26 wherein said slidable distal rear member further comprises a rotatable shoulder support member removably attachable to said slidable distal rear member.

* * * * *